(12) United States Patent
Leblond et al.

(10) Patent No.: US 9,430,449 B2
(45) Date of Patent: Aug. 30, 2016

(54) SYSTEMS, METHODS, AND MEDIA FOR MANAGING EDITABLE PREVIEWS OF WEBPAGES

(75) Inventors: D. A. P. Leblond, North Holland (NL); D. R. Pannekoek, Utrecht (NL); R. A. de Vries, Amsterdam (NL); E. de Voogd, South Holland (NL)

(73) Assignee: SDL plc, Maidenhead (GB)

( * ) Notice: Subject to any disclaimer, the term of this patent is extended or adjusted under 35 U.S.C. 154(b) by 159 days.

(21) Appl. No.: 13/436,656

(22) Filed: Mar. 30, 2012

(65) Prior Publication Data

US 2013/0262986 A1    Oct. 3, 2013

(51) Int. Cl.
| G06F 17/21 | (2006.01) |
| G06F 17/30 | (2006.01) |
| G06F 17/22 | (2006.01) |

(52) U.S. Cl.
CPC ......... *G06F 17/212* (2013.01); *G06F 17/2211* (2013.01); *G06F 17/2288* (2013.01); *G06F 17/3089* (2013.01)

(58) Field of Classification Search
CPC .... G06Q 10/06; G06Q 10/103; G06F 15/16; G06F 17/2247; G06F 17/24; G06F 17/30011; G06F 17/30233; G06F 17/30309; G06F 17/3089; G06F 21/6218; G06F 21/6227; G06F 2221/2141; G06F 2221/2147; G06F 2221/2149
USPC ................................................. 715/236, 751
See application file for complete search history.

(56) References Cited

U.S. PATENT DOCUMENTS

| 5,075,850 A | 12/1991 | Asahioka et al. |
| 5,295,068 A | 3/1994 | Nishino et al. |
| 5,477,451 A | 12/1995 | Brown et al. |
| 5,497,319 A | 3/1996 | Chong et al. |
| 5,644,775 A | 7/1997 | Thompson et al. |
| 5,675,802 A | 10/1997 | Allen et al. |
| 5,751,957 A | 5/1998 | Hiroya et al. |
| 5,774,868 A | 6/1998 | Cragun et al. |

(Continued)

FOREIGN PATENT DOCUMENTS

| EP | 1170680 | 1/2002 |
| EP | 2668599 | 12/2013 |

(Continued)

OTHER PUBLICATIONS

Colligan et al.; Special Edition Using Microsoft Office FrontPage 2003; 2004; Que Publishing; pp. 50-91 and 323-326.*

(Continued)

*Primary Examiner* — Andrew Dyer
(74) *Attorney, Agent, or Firm* — Carr & Ferrell LLP

(57) ABSTRACT

Systems and methods for managing an editable preview of a webpage are provided herein. Exemplary methods may include receiving a request to generate an editable preview of a webpage, via a preview server, the webpage comprising assets arranged according to a layout, responsive to the request, obtaining, via the preview server, assets from a content repository, generating, via the preview server, an editable preview of the webpage using the obtained assets and the layout, and providing, via the preview server, the preview of the webpage to an authoring environment for editing by a content editor in such a way that when the content editor edits at least one of the obtained assets, the at least one obtained asset is placed in a locked format to prevent editing by additional content editors.

19 Claims, 11 Drawing Sheets

(56) References Cited

U.S. PATENT DOCUMENTS

| | | | |
|---|---|---|---|
| 5,813,007 A | 9/1998 | Nielsen | |
| 5,884,097 A | 3/1999 | Li et al. | |
| 5,884,246 A | 3/1999 | Boucher et al. | |
| 5,894,554 A | 4/1999 | Lowery et al. | |
| 5,895,446 A | 4/1999 | Takeda et al. | |
| 5,966,685 A | 10/1999 | Flanagan et al. | |
| 5,978,828 A | 11/1999 | Greer et al. | |
| 5,987,401 A | 11/1999 | Trudeau | |
| 5,987,402 A * | 11/1999 | Murata et al. | 704/2 |
| 6,026,413 A | 2/2000 | Challenger et al. | |
| 6,041,333 A | 3/2000 | Bretschneider et al. | |
| 6,041,360 A | 3/2000 | Himmel et al. | |
| 6,092,035 A | 7/2000 | Kurachi et al. | |
| 6,108,703 A | 8/2000 | Leighton et al. | |
| 6,122,666 A | 9/2000 | Beurket et al. | |
| 6,128,652 A | 10/2000 | Toh et al. | |
| 6,128,655 A | 10/2000 | Fields et al. | |
| 6,161,082 A | 12/2000 | Goldberg et al. | |
| 6,163,785 A | 12/2000 | Carbonell et al. | |
| 6,216,212 B1 | 4/2001 | Challenger et al. | |
| 6,219,818 B1 | 4/2001 | Freivald et al. | |
| 6,256,712 B1 | 7/2001 | Challenger et al. | |
| 6,263,332 B1 | 7/2001 | Nasr et al. | |
| 6,278,969 B1 | 8/2001 | King et al. | |
| 6,330,566 B1 | 12/2001 | Durham | |
| 6,338,033 B1 | 1/2002 | Bourbonnais et al. | |
| 6,347,316 B1 | 2/2002 | Redpath | |
| 6,356,903 B1 | 3/2002 | Baxter et al. | |
| 6,363,337 B1 | 3/2002 | Amith | |
| 6,401,105 B1 | 6/2002 | Carlin et al. | |
| 6,438,540 B2 | 8/2002 | Nasr et al. | |
| 6,477,575 B1 | 11/2002 | Koeppel et al. | |
| 6,526,426 B1 | 2/2003 | Lakritz | |
| 6,581,061 B2 * | 6/2003 | Graham | |
| 6,623,529 B1 | 9/2003 | Lakritz | |
| 6,725,333 B1 | 4/2004 | Degenaro et al. | |
| 6,748,569 B1 | 6/2004 | Brooke et al. | |
| 6,782,384 B2 | 8/2004 | Sloan et al. | |
| 6,973,656 B1 | 12/2005 | Huynh et al. | |
| 7,111,229 B2 * | 9/2006 | Nicholas et al. | 715/209 |
| 7,249,314 B2 * | 7/2007 | Walker et al. | 715/205 |
| 7,383,320 B1 | 6/2008 | Silberstein et al. | |
| 7,606,814 B2 | 10/2009 | Deily et al. | |
| 7,698,126 B2 * | 4/2010 | Kohlmeier et al. | 704/8 |
| 7,904,595 B2 | 3/2011 | Cheng et al. | |
| 7,949,633 B1 * | 5/2011 | Shaver et al. | 707/620 |
| 7,958,453 B1 * | 6/2011 | Taing | 715/744 |
| 8,015,222 B2 | 9/2011 | Abnous et al. | |
| 8,185,830 B2 * | 5/2012 | Saha et al. | 715/762 |
| 8,296,463 B2 | 10/2012 | Cheng et al. | |
| 8,413,045 B2 * | 4/2013 | Lemonik et al. | 715/234 |
| 8,453,052 B1 * | 5/2013 | Newman et al. | 715/255 |
| 8,909,683 B1 | 12/2014 | Ledet | |
| 2001/0029507 A1 | 10/2001 | Nojima | |
| 2002/0007383 A1 | 1/2002 | Yoden et al. | |
| 2002/0023101 A1 | 2/2002 | Kurihara et al. | |
| 2002/0065848 A1 * | 5/2002 | Walker et al. | 707/511 |
| 2002/0103698 A1 | 8/2002 | Cantrell | |
| 2002/0112013 A1 | 8/2002 | Walsh | |
| 2002/0120762 A1 | 8/2002 | Cheng et al. | |
| 2002/0178166 A1 | 11/2002 | Hsia | |
| 2003/0163346 A1 | 8/2003 | Tinti et al. | |
| 2004/0010496 A1 | 1/2004 | Behrendt et al. | |
| 2004/0019849 A1 * | 1/2004 | Weng et al. | 715/513 |
| 2004/0044576 A1 | 3/2004 | Kurihara et al. | |
| 2004/0148409 A1 | 7/2004 | Davis et al. | |
| 2004/0187090 A1 | 9/2004 | Meacham | |
| 2005/0039116 A1 * | 2/2005 | Slack-Smith | 715/511 |
| 2005/0086105 A1 | 4/2005 | McFadden et al. | |
| 2005/0228865 A1 | 10/2005 | Hirsch | |
| 2005/0246283 A1 * | 11/2005 | Gwiazda et al. | 705/52 |
| 2006/0053367 A1 | 3/2006 | Chen et al. | |
| 2006/0080397 A1 | 4/2006 | Chene et al. | |
| 2006/0178918 A1 | 8/2006 | Mikurak | |
| 2006/0248442 A1 | 11/2006 | Rosenstein et al. | |
| 2007/0033104 A1 | 2/2007 | Collins et al. | |
| 2007/0047781 A1 | 3/2007 | Hull et al. | |
| 2007/0048714 A1 | 3/2007 | Plastina et al. | |
| 2007/0083425 A1 | 4/2007 | Cousineau et al. | |
| 2007/0118545 A1 | 5/2007 | Chandrasekharan et al. | |
| 2007/0208991 A1 | 9/2007 | Rider | |
| 2007/0209005 A1 | 9/2007 | Shaver et al. | |
| 2007/0234213 A1 | 10/2007 | Krikorian et al. | |
| 2008/0195664 A1 | 8/2008 | Maharajh et al. | |
| 2008/0209320 A1 | 8/2008 | Mawhinney et al. | |
| 2008/0244053 A1 | 10/2008 | Sampson et al. | |
| 2008/0316228 A1 | 12/2008 | Seljavaara | |
| 2009/0061764 A1 | 3/2009 | Lockhart et al. | |
| 2009/0099931 A1 | 4/2009 | Aaltonen et al. | |
| 2009/0197580 A1 * | 8/2009 | Gupta et al. | 455/414.2 |
| 2009/0217352 A1 * | 8/2009 | Shen et al. | 726/3 |
| 2009/0248801 A1 * | 10/2009 | Then et al. | 709/204 |
| 2009/0259684 A1 | 10/2009 | Knight et al. | |
| 2009/0313245 A1 | 12/2009 | Weyl et al. | |
| 2010/0070364 A1 | 3/2010 | Dugan | |
| 2010/0070843 A1 * | 3/2010 | Duym | 715/224 |
| 2010/0211865 A1 | 8/2010 | Fanning et al. | |
| 2010/0233996 A1 | 9/2010 | Herz et al. | |
| 2010/0257457 A1 * | 10/2010 | De Goes | 715/751 |
| 2010/0274661 A1 | 10/2010 | Aaltonen et al. | |
| 2010/0281008 A1 | 11/2010 | Braunwarth | |
| 2010/0312619 A1 | 12/2010 | Ala-Pietila et al. | |
| 2011/0047468 A1 * | 2/2011 | Ishizaka | G06F 9/54 715/735 |
| 2011/0078626 A1 | 3/2011 | Bachman et al. | |
| 2011/0191458 A1 | 8/2011 | Cheng et al. | |
| 2011/0264736 A1 | 10/2011 | Zuckerberg et al. | |
| 2011/0270975 A1 * | 11/2011 | Troup | 709/224 |
| 2012/0023129 A1 | 1/2012 | Vedula et al. | |
| 2012/0096366 A1 | 4/2012 | Narla et al. | |
| 2012/0131441 A1 | 5/2012 | Jitkoff et al. | |
| 2012/0136718 A1 | 5/2012 | Katti | |
| 2012/0143816 A1 | 6/2012 | Zhang et al. | |
| 2012/0185759 A1 * | 7/2012 | Balinsky et al. | 715/209 |
| 2012/0197718 A1 | 8/2012 | Martchenko et al. | |
| 2012/0197770 A1 * | 8/2012 | Raheja et al. | 705/30 |
| 2012/0197957 A1 | 8/2012 | de Voogd | |
| 2012/0221407 A1 | 8/2012 | Erasmus et al. | |
| 2013/0031470 A1 | 1/2013 | Daly, Jr. et al. | |
| 2013/0067055 A1 | 3/2013 | Cheng et al. | |
| 2013/0097488 A1 | 4/2013 | Coman et al. | |
| 2013/0144566 A1 * | 6/2013 | De Biswas | 703/1 |
| 2013/0151940 A1 * | 6/2013 | Bailor et al. | 715/229 |
| 2013/0304607 A1 | 11/2013 | Costa et al. | |
| 2014/0019625 A1 | 1/2014 | Cheng et al. | |
| 2014/0081775 A1 | 3/2014 | Leblond et al. | |
| 2014/0082032 A1 | 3/2014 | Leblond et al. | |
| 2014/0181013 A1 | 6/2014 | Micucci et al. | |
| 2015/0040000 A1 | 2/2015 | Rice et al. | |
| 2015/0149885 A1 | 5/2015 | Homer et al. | |
| 2015/0149886 A1 | 5/2015 | Homer et al. | |

FOREIGN PATENT DOCUMENTS

| | | |
|---|---|---|
| EP | 2668626 | 12/2013 |
| EP | 2678814 | 1/2014 |
| EP | 2896007 | 7/2015 |
| EP | 2896008 | 7/2015 |
| JP | 2001117847 | 4/2001 |
| JP | 2001136583 A | 5/2001 |
| JP | 2001188992 | 7/2001 |
| JP | 2001350790 | 12/2001 |
| JP | 2002073677 | 3/2002 |
| JP | 2002132822 A | 5/2002 |
| JP | 2003032660 | 1/2003 |
| JP | 2004538542 A | 12/2004 |
| JP | P2005056080 | 3/2005 |
| JP | 2005267535 A | 9/2005 |
| JP | 2008027265 | 2/2008 |
| JP | 2009020845 | 1/2009 |
| JP | 2009518761 A | 5/2009 |
| JP | 2009301480 A | 12/2009 |
| JP | 2010152588 | 7/2010 |
| WO | 030081441 | 2/2003 |

(56) References Cited

FOREIGN PATENT DOCUMENTS

| WO | WO2012101240 | 8/2012 |
|---|---|---|
| WO | WO2012101243 | 8/2012 |
| WO | WO2012113791 | 8/2012 |
| WO | WO2013144358 | 10/2013 |
| WO | WO2013167734 | 11/2013 |
| WO | WO2014041148 | 3/2014 |
| WO | WO2014041149 | 3/2014 |

OTHER PUBLICATIONS

"Highlight;" Microsoft Computer Dictionary; May 1, 2002; Microsoft Press; p. 320.*
Preview; Feb. 26, 2011; Dictionary.com; pp. 1-2.*
Matthew Edgar; Why do browsers display my site differently? Jun. 3, 2009 (updated Nov. 2010); matthewedgar.net; pp. 1-5.*
XP007905525, The Technical Aspects Identified in the Present Application (Art. 15 PCT) are considered part of common general knowledge. Due to their notoriety no documentary evidence is found to be required. Official Journal Nov. 2007, p. 592.
Challenger et al., "A Scalable System for Consistently Caching Dynamic Web Data", INFOCOM '99. Eighteenth Annual Joint Conference of the IEEE Computer and Communications Societies. Proceedings. IEEE, Mar. 21-25, 1999, pp. 294-303, vol. 1.
Croll et al., "Content Management—The Users Requirements", International Broadcasting Convention, Conference Publication No. 447, Sep. 12-16, 1997.
IDIOM, Inc. "WorldServer 2 White Paper", 2000, 19 pages.
Market Wire. "VerticalNet Selects Uniscape as Globalization Provider to Speed Global Expansion", Jun. 2000, <www. findarticles.com/p/articles/mi_pwwi/is_200006/ai_mark01011558/print> accessed on Oct. 1, 2005, 2 pages.
PRNewsWire and NEWSdesk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.
Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.
Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.
Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Oct. 1, 2005, 2 pages.
Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.
My Yahoo—RSS Headlines Module—"Frequently Asked Questions," Jan. 24, 2004, <http://web.archive.org/web/20040124175747/http://my.yahoo.com/s/rss-f aq. htm1> accessed on Dec. 17, 2008, 4 pages.
Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
"The GNU Make Manual", Version 3.79, edition 0.55, Apr. 2000, Free Software Foundation, Inc, pp. 1-8, 118, 128.
Rational Software Corporation, "Introduction to ClearCase", Dec. 1999, Rational ClearCase, Release 4.0, pp. i-xiv, 1, 2, 30, 33, 37, 40, 59.
Rational Software Corporation, "Administering ClearCase", Rational ClearCase Release 4.0, 1999, pp. i-xxx, 1-6, 129-162, 255-260, 278, 281, 283, 345-348.
Challenger et al., "A Publishing System for Efficiently Creating Dynamic Web Content", INFOCOM 2000. Nineteenth Annual Joint Conference of the IEEE Computer and Communications Societies. Proceedings. IEEE, Mar. 26-30, 2000, vol. 2, pp. 1-7, 10.
Krishnan, "Unmittelbare Ergenbnisse Noch Schneller: Google Vorschau—Der Google Produkt-Kompass," Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages.
International Search Report and Written Opinion Mailed Oct. 23, 2013 in Patent Cooperation Treaty application No. PCT/EP2013/056842, filed Mar. 29, 2013, pp. 1-10.
International Search Report and Written Opinion Mailed Jan. 8, 2014 in Patent Cooperation Treaty application No. PCT/EP2013/069078, filed Sep. 14, 2013, pp. 1-8.
International Search Report and Written Opinion Mailed Jan. 8, 2014 in Patent Cooperation Treaty application No. PCT/EP2013/069077, filed Sep. 14, 2013, pp. 1-8.
First Examination Report mailed Jun. 17, 2014 in European Patent Convention application No. 12707723.8, filed Feb. 21, 2012, pp. 1, 3-6.
Non-Final Office Action, Mar. 2, 2015, U.S. Appl. No. 13/016,989, filed Jan. 29, 2011.
Non-Final Office Action, Feb. 26, 2015, U.S. Appl. No. 13/886,194, filed May 2, 2013.
Final Office Action, Mar. 18, 2015, U.S. Appl. No. 13/609,293, filed Sep. 11, 2012.
Non-Final Office Action, May 19, 2015, U.S. Appl. No. 13/886,199, filed May 2, 2013.
Final Office Action, Apr. 6, 2015, U.S. Appl. No. 13/016,988, filed Jan. 29, 2011.
Non-Final Office Action, Mar. 10, 2016, U.S. Appl. No. 13/035,852, filed Feb. 25, 2011.
Advisory Action, Feb. 9, 2016, U.S. Appl. No. 13/016,989, filed Jan. 29, 2011.
Non-Final Office Action, Dec. 14, 2015, U.S. Appl. No. 13/886,194, filed May 2, 2013.
Final Office Action, Jan. 19, 2016, U.S. Appl. No. 13/886,199, filed May 2, 2013.
Summons to Attend Oral Proceedings mailed Feb. 11, 2015 in European Patent Convention application No. 1270772.8, filed Feb. 21, 2012, pp. 1-7.
"Inheritance (object-oriented programming)", archived Wikipedia on Sep. 4, 2011, http://en.wikipedia.org/w/index.php?title=Inheritance_(object-oriented_programming)&oldid=448382925, pp. 1-7.
Summons to Attend Oral Proceedings mailed Feb. 11, 2015 in European Patent Convention application No. 12707723.8, filed Feb. 21, 2012, pp. 1-7.
"Inheritance (object-oriented programming)", archived Wikipedia on Sep. 4, 2011, http://en.wikipedia.org/w/index.php?title=Inheritance_(object-oriented_programming)&oldid=448382925, pp. 1-7.
Office Action mailed Jan. 5, 2016 in Japanese Patent Application 2013-550887 filed Jul. 26, 2013, pp. 1-20.
Office Action mailed Dec. 22, 2015 in Japanese Patent Application 2013-550888 filed Jan. 27, 2012, pp. 1-20.
Office Action mailed Feb. 9, 2016 in Japanese Patent Application 2013-554869 filed Feb. 21, 2012, pp. 1-4.
Non-Final Office Action, May 11, 2016, U.S. Appl. No. 13/016,988, filed Jan. 29, 2011.
Non-Final Office Action, May 3, 2016, U.S. Appl. No. 13/609,293, filed Sep. 11, 2012.
Final Office Action, Jul. 12, 2016, U.S. Appl. No. 13/886,194, filed May 2, 2013.
Final Office Action, May 3, 2016, U.S. Appl. No. 14/023,384, filed Sep. 10, 2013.
Final Office Action, Jun. 14, 2016, U.S. Appl. No. 14/091,329, filed Nov. 26, 2013.
Non-Final Office Action, Jul. 14, 2016, U.S. Appl. No. 14/093,015, filed Nov. 28, 2013.

* cited by examiner

SYSTEMS, METHODS, AND MEDIA FOR MANAGING EDITABLE PREVIEWS OF WEBPAGES

FIELD OF THE TECHNOLOGY

Embodiments of the disclosure relate to generating and managing editable previews of webpages. More specifically, but not by way of limitation, the present technology generates editable and non-editable previews of webpages that comprise content (e.g., assets), manages the editing of such previews (e.g., the editing of assets), and the updating of webpages based upon the edits made to the assets of the previews for editing by a content editor in such a way that when the content editor edits at least one of the obtained assets, the at least one obtained asset is placed in a locked format to prevent editing by additional content editors. More specifically, it will be understood that the editing of content for a webpage may occur at a granular level, such as at the level of individual assets within the webpage (for example textual content, multimedia files, image files, and so forth). Additionally, the editing of an asset of one particular preview may result in the updating of individual assets of single or multiple webpages with similar content (e.g., webpages that each comprises the same asset, such as a particular image file). The present technology may also manage editing privileges of content editors and facilitate editing sessions.

BACKGROUND OF THE DISCLOSURE

In general, for a content editor to view a webpage as it would be rendered on an end user computing system, the content editor must first publish the webpage to a publishing server. The content editor must then utilize a browser application to view the webpage. When the content editor modifies the content of the webpage, the content editor must again publish the webpage and view the webpage in a browser application. This process is highly inefficient and time consuming. Moreover, when multiple content editors attempt to modify the same webpage, the content editors may unknowingly edit the same asset at the same time. Such duplicative editing may lead to confusion and inefficiency.

SUMMARY OF THE DISCLOSURE

According to some embodiments, the present technology may be directed to methods for managing an editable preview of a webpage. The methods may comprise: (a) receiving a request to generate an editable preview of a webpage, via a preview server, the webpage comprising assets arranged according to a layout; (b) responsive to the request, obtaining, via the preview server, assets of the webpage from at least one content repository; (c) generating, via the preview server, an editable preview of the webpage using the obtained assets and the layout; and (d) providing, via the preview server, the editable preview of the webpage to an authoring environment for editing by a content editor in such a way that when the content editor edits at least one of the obtained assets, the at least one obtained asset is placed in a locked format to prevent editing by additional content editors.

According to other embodiments, the present technology is directed to an authoring environment for generating a preview of a webpage, the authoring environment comprising: (a) a memory for storing executable instructions; (b) a processor for executing the instructions to: (i) receive a request to generate a preview of a webpage, the webpage comprising assets arranged according to a layout; (ii) obtaining the assets of the webpage from at least one content repository; (iii) generate a preview of the webpage using the obtained assets and the layout; and (iv) provide the preview of the webpage for editing by a content editor in such a way that when the content editor edits at least one of the obtained assets, the at least one obtained asset is placed in a locked format to prevent editing by additional content editors, the authoring environment being separate from a preview server that publishes the webpage.

According to some embodiments, the present technology may include methods for generating an editable preview of a webpage by: (a) determining delta content for a webpage, the delta content comprising changes in content between a published version of the webpage and at least one non-published version of the webpage; (b) obtaining both the content of the published version of the webpage and the delta content; (c) generating a preview of the webpage using both the content of the published version of the webpage and the delta content; and (d) providing, via the preview server, the preview of the webpage to an authoring environment for editing by a content editor in such a way that when the content editor edits at least one of the obtained assets, the at least one obtained asset is placed in a locked format to prevent editing by additional content editors.

According to some embodiments, the present technology may include methods for generating an editable preview of a webpage by: (a) determining delta content for a webpage, the delta content comprising changes in at least a portion of content between a published version of the webpage and at least a portion of a non-published version of the webpage; (b) obtaining at least a portion of the content of the published version of the webpage and the delta content; (c) generating a preview of the webpage using the obtained content of the published version of the webpage and the delta content; and (d) providing the preview of the webpage to an authoring environment generated by a preview server.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
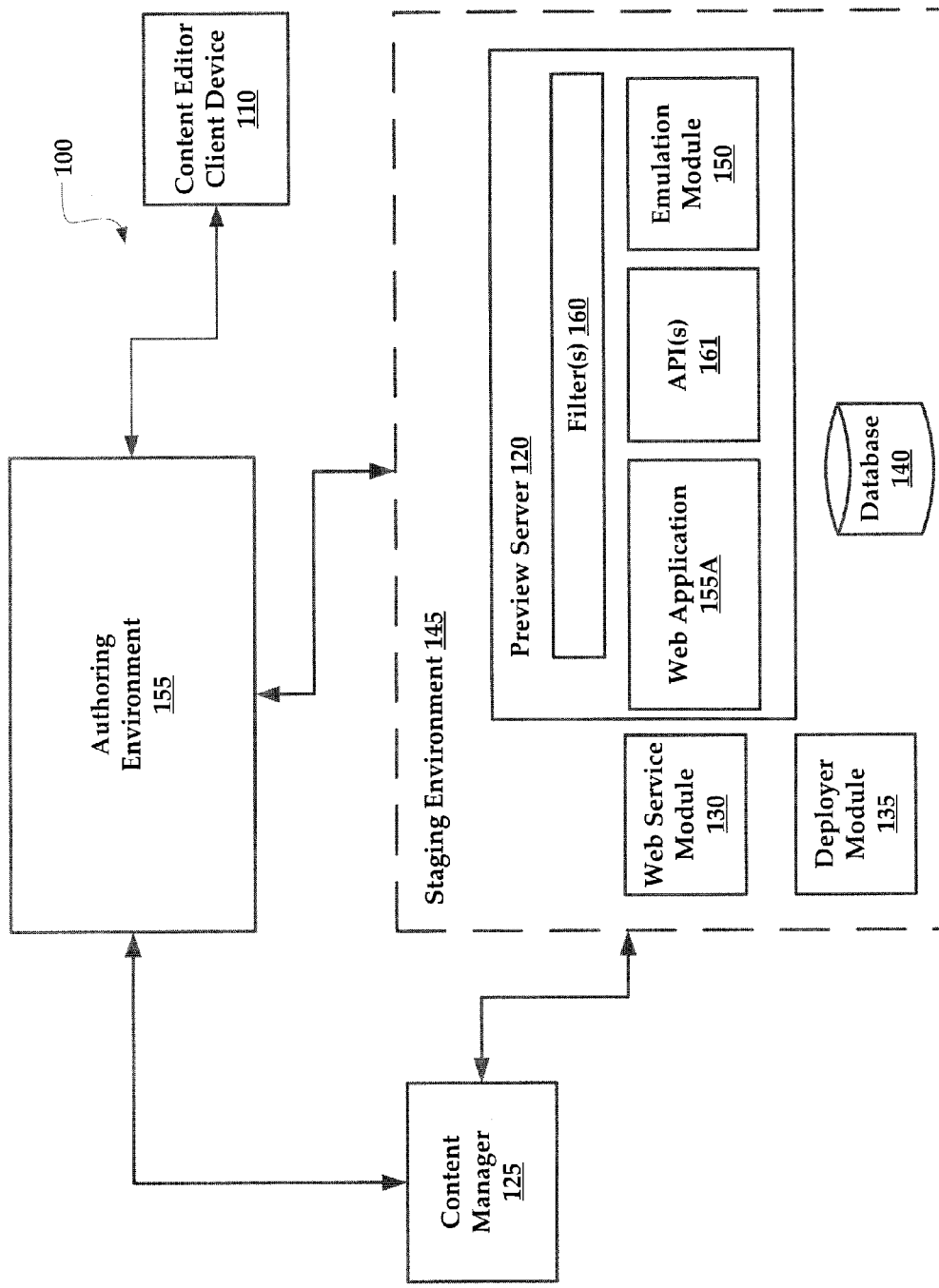
FIG. 1 illustrates an exemplary architecture for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology may generate editable and non-editable previews of webpages. Additionally, the present technology may allow content editors to stage and preview modifications to webpages that are currently published on a web server. In other instances, the present technology may allow content editors to generate and edit new webpages that have yet to be published to a web server. The content of these yet-to-be published webpages may also be modified, staged and previewed utilizing the present technology.

The present technology may impose editing privileges on content editors, by locking and unlocking previews of webpages such that only one content editor may edit the preview of the webpage and/or assets on the webpage at a time.

It is noteworthy that while the following description may refer to the editing of previews of webpages generally, it will be understood that the editing of a preview of a webpage may comprise the modifying, editing, adjusting, deleting, adding, repositioning, replacing, and so forth, of individual assets (e.g., content) of the preview. Moreover, an asset may be composed of individual objects, such as an image gallery that comprises individual image files. As such, content editors may modify and/or edit the individual objects of the asset.

If a content editor attempts to edit at least a portion of a preview of a webpage when another content editor is already editing the preview, the present technology may notify other content editors that the portion of the preview is locked. The present technology may also provide unlocked notifications when the content editor is finished editing the preview. That is, when the content editor that is currently editing the preview has released a preview, the present technology may inform a subsequent content editor that the content of the preview/webpage has been unlocked. More specifically, notification may likewise occur on a more granular or asset specific level such that two or more content editors may edit the same preview. If a first content editor has selected an asset for editing, the present technology may place that asset in a locked format. As such, a second content editor may be prevented from editing the asset while the first content editor is editing the asset. The present technology may highlight and/or mark the asset that is currently being edited to indicate that it is unavailable for editing, as will be described in greater detail herein.

According to some embodiments, the present technology may also employ emulation templates that allow content editors to generate previews of webpages that emulate how an end-user computing system, and specifically a browser application of an end-user computing system, would render the webpage. The present technology may allow content editors to select emulation attributes such as operating system, browser application type and version, first visitor attributes, and so forth. In some instances, the application of an emulation template may cause the output of a web application or a content web service (e.g., web server) to change depending upon actual content attributes and/or emulation attributes, as will be described in greater detail below.

The present technology may also store content (e.g., such as assets) and changes to content for a webpage into various content repositories. In some embodiments, a staging server may be utilized to combine currently published content, also known as disclosed content, for a webpage with modified content "delta content," to create a staged version of an updated preview. The staged version of the updated preview may be provided to an authoring environment by a preview server. The modified content may include edits or modifications to the editable preview received from content editors.

In some instances, the preview that is provided to a content editor may be based upon access privileges for the content editor. For example, if a content editor only has access privileges that allow them to modify textual content, the editable preview may only allow that content editor to modify textual content. As such, other webpage assets such as images or video may be inaccessible to the content editor. Additionally, content editor actions may be restricted by access privileges, as well as workflow constraints.

After editing, modified content may be incorporated into the webpage and thereafter published.

Additional advantages of the present technology will be described in greater detail with reference to the collective FIGS. 1-11.

FIG. 1 illustrates an exemplary architecture 100 for practicing aspects of the present technology. The architecture 100 may be implemented in a cloud-based computing environment, or as a web server that is particularly purposed to generate and manage previews of webpages.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the architecture 100 may include a distributed group of computing devices such as web servers that do not share computing resources or workload. Additionally, the architecture 100 may include a single computing device, such as a web server, that has been provisioned with one or more programs that are utilized to manage data incidents.

Content editors may access and interact with the architecture 100 via content editor client devices 110 through a web-based interface, as will be discussed in greater detail infra. Alternatively, end users may access and interact with the architecture 100 via a downloadable program that executes on the content editor client device 110.

The various components of architecture 100 may be selectively and communicatively coupled with one another via network connections. The network connections utilized by the architecture 100 may include any one (or combination) of a number of private and public communications mediums such as the Internet. In some instances, the architecture 100 may utilize secure hyper text transfer protocols (HTTPS) to communicate both webpage content and delta content.

The architecture 100 may be generally described as a mechanism for generating and managing editable and non-editable previews of webpages and for incorporating modifications into webpages based upon edits or modifications to assets of the previews.

According to some embodiments, the architecture 100 may generally comprise a preview server 120, an authoring environment 155, a content manager 125, a web service module 130, a deployer module 135, a database 140, and a staging environment 145, which may comprise a web application 155A an emulation module 150, one or more API(s) 161, and one or more filter(s) 160. The preview server 120 may be associated with the staging environment 145.

As used herein, component terms such as "module," "generator," "engine," and "environment" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual components described above may include separately configured web servers. Also, the components of the architecture 100 may be provisioned with a cloud, as mentioned in greater detail above.

Prior to discussing the operations of the architecture 100, a brief description of the webpage content utilized by the present technology will be described. A webpage and/or an editable/non-editable preview of a webpage may include various types of content. This content may comprise assets such as textual information, images, video, audio, and/or any other typical assets for webpages that would be included in a webpage that would be known to one of ordinary skill in the art with the present disclosure before them. It will be understood that the assets may be arranged according to a particular format or layout. That is, the assets may be positioned on the webpage to create a particular visual arrangement.

Additionally, each asset may be associated with its respective webpage by way of an identifier. Therefore, assets that are stored in a content repository such as database 140 may be retrieved by the staging environment 145 utilizing identifiers associated with the webpage. Assets may be identified within the webpage using hypertext markup language comments.

Generally speaking, the preview server 120 is a particular purpose computing device that comprises at least one processor and a memory for storing executable instructions. In some instances the executable instructions may be referred to as "web application 155A." The processor of the preview server 120 may execute the web application 155A to cooperate with the authoring environment 155, staging environment 145 and the content manager 125 to generate previews (both editable and non-editable) of webpages, as well as execute other functionalities which will be described in greater detail below.

To generate a preview of a webpage, the preview server 120 may request that the staging environment 145 obtain assets from the database 140 or other components of the architecture 100. The staging environment 145 may obtain assets using the asset identifiers associated with the webpage. Further details regarding how the staging environment 145 obtains content for generating an editable preview of a webpage are described in greater detail below.

An editable preview of a webpage may be understood to include content for the webpage, which may or may not be currently published. In some instances, the editable preview may include content from a currently published webpage, along with delta content that represents changes in content for the webpage since it was published.

Rather than requiring the content editor to modify the content of the webpage using a webpage creation application, which often only includes the computer executable code that is rendered by a browser application, the preview is a rendering of the webpage that allows the content editor to view their edits to the webpage in a visual format that substantially conforms to how the website will actually be rendered by browsing application. In sum, the editable preview allows content editors to edit their content in context. Content editors can see their modifications in near-real-time.

It will be understood that in some instances, the preview that is generated by the preview server 120 may not be editable, but a visual representation of the combination of both currently published content and delta content for a webpage. Stated otherwise, the preview may be a view onto the various versions of a webpage managed by the content manager 125.

Additional details regarding the content manager 125 may be found in co-pending applications U.S. Ser. No. 13/035,852, U.S. Ser. No. 13/016,989, and U.S. Ser. No. 13/016,988, which are hereby incorporated by reference herein in their entirety.

In other embodiments, the preview server 120 may generate editable previews of webpages that are displayed within the authoring environment 155.

In operation, when a preview (editable and/or non-editable) of a webpage is requested, a session token may be generated by the web service module 130 which passes the session token to the content manager 125 that determines eligible versions of the webpage for which an editable preview is to be generated. For example, eligible versions may comprise previous edits to a webpage created by one or more content editors. The content manager 125 may then provide the session token to the authoring environment 155 for generation of the editable preview through the preview server 120. The session token may also be utilized for subsequent calls to the content manager 125, which in turn, may provide the session token to the web service module 130. The provision and exchange of session tokens throughout the architecture 100 during the generation of previews and the editing of such previews may allow edits to be tracked and recorded.

The content manager 125 may determine changes between a published version of the webpage and the one or more edited versions of the published webpage. This changed content may also be referred to as delta content. In some instances a currently published version of the webpage may be stored within a content repository of the deployer module 135. If any delta content is determined by the content manager 125, the delta content may be transmitted, along with the session token, to the web service module 130.

The authoring environment 155 may also pass the session token to the preview server 120 where one or more filters 160 cooperate with one or more application programming interfaces (API(s)) 160 to gather content from both the deployer module 135 and the web service module 130. More specifically, the staging environment 145, using the session token, may obtain published content from the deployer module 135 and delta content from the web service module 130. The data gathered from the deployer module 135 and the web service module 130 may be obtained from one or more filesystem-based repositories, database-based repositories or combination thereof, such as database 140.

The published content and the delta content may be assembled by the staging environment 145 prior to generation of a preview of the webpage by the preview server 120.

It is noteworthy to mention that in some instances the preview server 120 and/or a filter 160 of the staging environment 145 may selectively modify the content or appearance of the preview of the webpage based upon access rights of the content editor. That is, the access rights of the content editor may affect how the preview server 120 generates the preview of the webpage. For example, a content editor may have access rights that only allow the content editor to view certain types of assets, such as video assets or image assets. Therefore, the preview of the webpage that is generated by the preview server 120 may only comprise those assets to which the content editor has permission to access or view.

Content editors may view and interact with these editable previews, using a web-based interface generated by the authoring environment 155. Content editors may access this web-based interface using their content editor client device 110.

Per each session, multiple content editors may make modifications to the content of the preview of the webpage. During the session, the content of the webpage currently being edited by a first content editor may be locked for additional content editors to ensure that only the first content editor may edit the asset. The additional content editors may edit assets of the same webpage that are not currently locked.

As the content of the webpage is modified, the preview of the webpage may be updated periodically (or potentially in near-real-time) to reflect the modifications.

During an editing session the authoring environment 155 may provide notification to a subsequent content editor who attempts to edit configuration locked asset of the editable preview. While a preview of the webpage may be generated, the preview of the webpage may comprise a notification such as a red border that outlines at least a portion of the locked asset and/or an image of a lock. The color of the borders/highlighting may be end-user configurable. For example, each content editor may be assigned a particular color for purposes of differentiating edits made by various content editors from one another.

After the content editor has finished with their editing session, the authoring environment 155 may unlock the webpage in anticipation of another editing session. In some instances, the authoring environment 155 may provide notification to the subsequent content editor described above that the locked asset of the editable preview has been unlocked and is available for editing (assuming that the content editor has access rights to modify the asset).

According to some embodiments, the preview that is generated for the content editor may include highlighting for assets that have been modified. The highlighting may include outlining at least a portion of a changed asset with a green color. A preview of the same webpage that is generated for a subsequent content editor may highlight the assets in a different color, such as gray. Highlighting aids the subsequent content editor in determining recent changes to the webpage generated during the previous editing session. Again, the previously modified assets may be locked to prevent subsequent editing. If the assets have been locked, the asset highlighting may include a locked notification such as a lock icon. Clicking on the lock icon may provide additional details regarding the locked state of the asset, such as the content editor that last modified the asset, along with a timestamp and other pertinent data regarding the asset.

It will be understood that in some embodiments each editing session may generate a different version of the webpage. Each unique version may be identified by its respective session token. Therefore, in some instances, to generate a preview of a webpage, the preview server 120 may identify delta content for a webpage using several session tokens.

According to some embodiments, the emulation module 150 may be utilized to generate various previews of the same webpage. The emulation module 150 may apply an emulation template to the webpage to generate a view of the webpage as it would be rendered by a particular computing system that utilizes a particular browser application. It will be understood that a webpage may be rendered differently depending upon the operating system and browser application that is utilized to render the webpage. For example, a rendering of a webpage by a computing system that utilizes a version of the Windows® operating system and Internet Explorer browser may have a visual appearance that differs from a rendering of the same webpage by a computing system that utilizes a version of the Mac OSX operating system and the Safari browser.

Additionally, emulation may also comprise selecting targeted assets for a particular webpage based on the relevancy of the assets for a particular webpage. As mentioned above, additional information regarding the selection of relevant and/or targeted content may be found in co-pending applications U.S. Ser. No. 13/035,852, U.S. Ser. No. 13/016,989, and U.S. Ser. No. 13/016,988.

When an emulation template is applied to the webpage to generate the preview, the resulting preview may indicate how a webpage will be rendered on a corresponding system. For example, the application of an emulation template may generate an editable preview that illustrates that certain images are smaller than anticipated, or that the layout of the webpage is different than anticipated. The preview may also help content editors determine aesthetic and/or functional aspects of the webpage, such as a balance between content and media.

Thus, rather than maintaining a plurality of test boxes (computing systems with different permutations of operating systems and browsing applications, relative to one another) and utilizing the test boxes to render previews of the webpage, different emulation templates may be invoked.

According to some embodiments, each emulation template may include various permutations of emulation attributes. Generally speaking, the emulation attributes may comprise visitor preferences, ambient data, computing device characteristics, or any combinations thereof, although one or ordinary skill in the art will appreciate that other types of emulation attributes that may affect how the webpage is displayed on the authoring environment 155. More specifically, exemplary emulation attributes may comprise operating system selections and browser application selections (including different selections for browser types and versions). Operating system selections may also be versioned. For example, different emulation templates may be selectable for different versions of Windows XP which vary based up service pack installation.

In addition, the emulation template may specify that the preview should be rendered as if the browser application was rendering the webpage for the first time (e.g., first time visitor overwrite), along with other overwrite settings that would be known to one of ordinary skill in the art.

Figure 2:
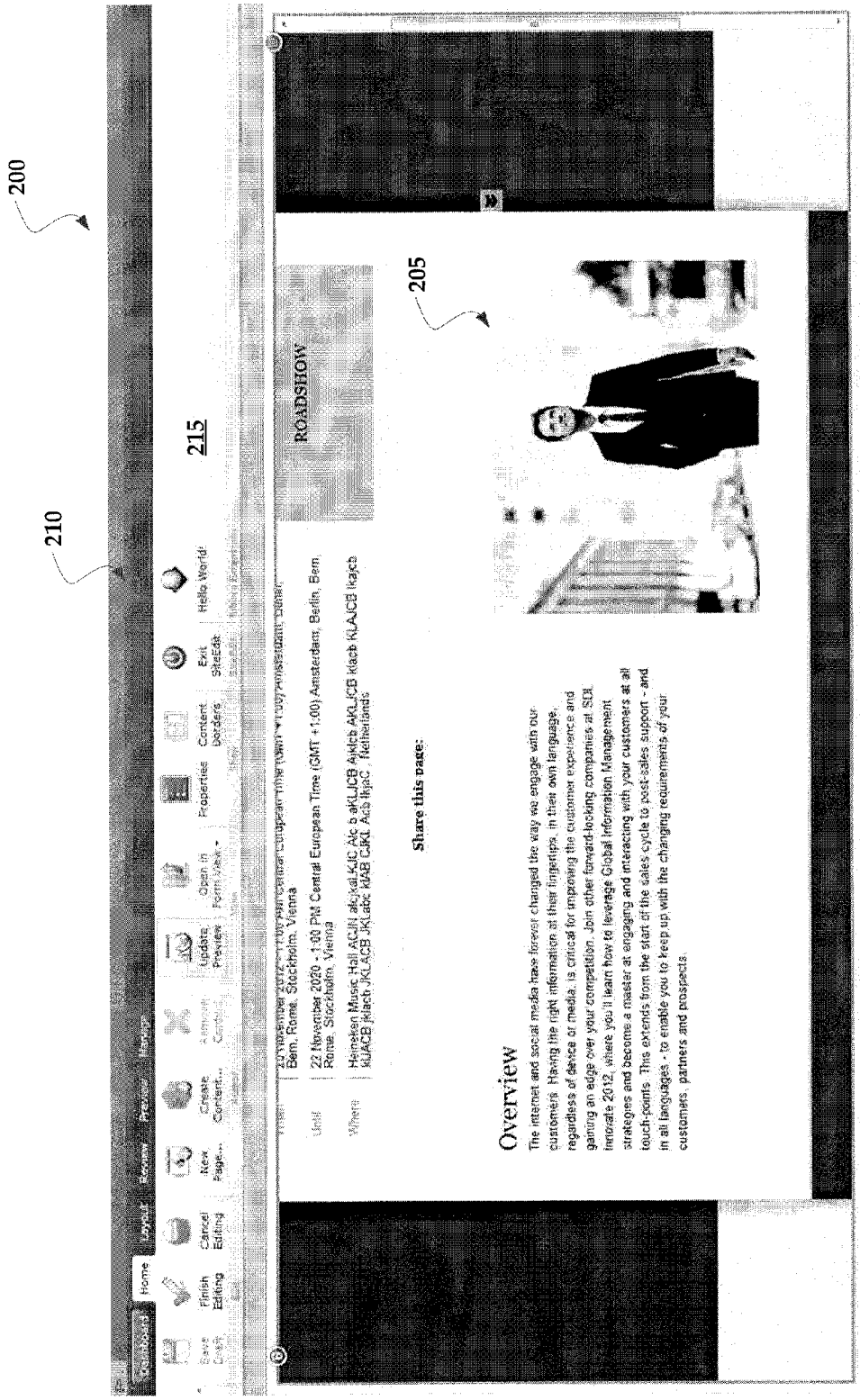
FIG. 2 illustrates an exemplary editable preview of a webpage.

FIG. 2 illustrates an exemplary editable preview 200 of a webpage. The editable preview 200 is shown as comprising a plurality of assets such as image asset 205. The editable preview 200 has been rendered within a graphical user interface 210 that includes a ribbon 215. The ribbon 215 may comprise a plurality of functionalities that allow content editors to modify the content of the editable preview 200.

Figure 3:
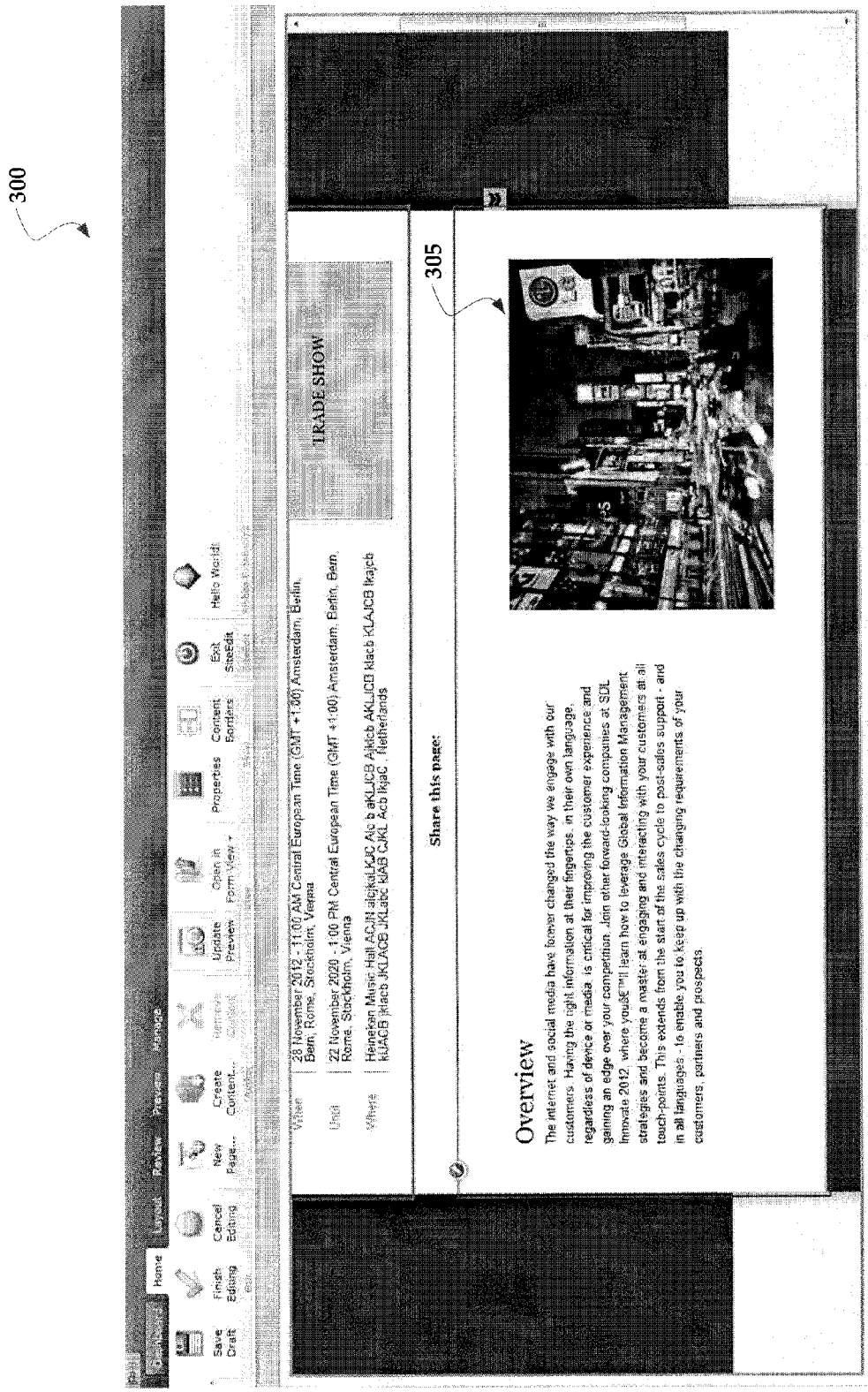
FIG. 3 illustrates an exemplary updated editable preview of a webpage.

FIG. 3 illustrates an exemplary updated editable preview 300 of a webpage. The editable preview 300 is shown as comprising a plurality of assets such as image asset 305. It is noteworthy that the updated editable preview 300 is otherwise identical to editable preview 200 of FIG. 2 with the exception that image asset 205 of FIG. 2 has been replaced with image asset 305, in FIG. 3. The image asset 305 may be linked to the webpage using an identifier that is stored in the HTML comments of the webpage.

Figure 4:
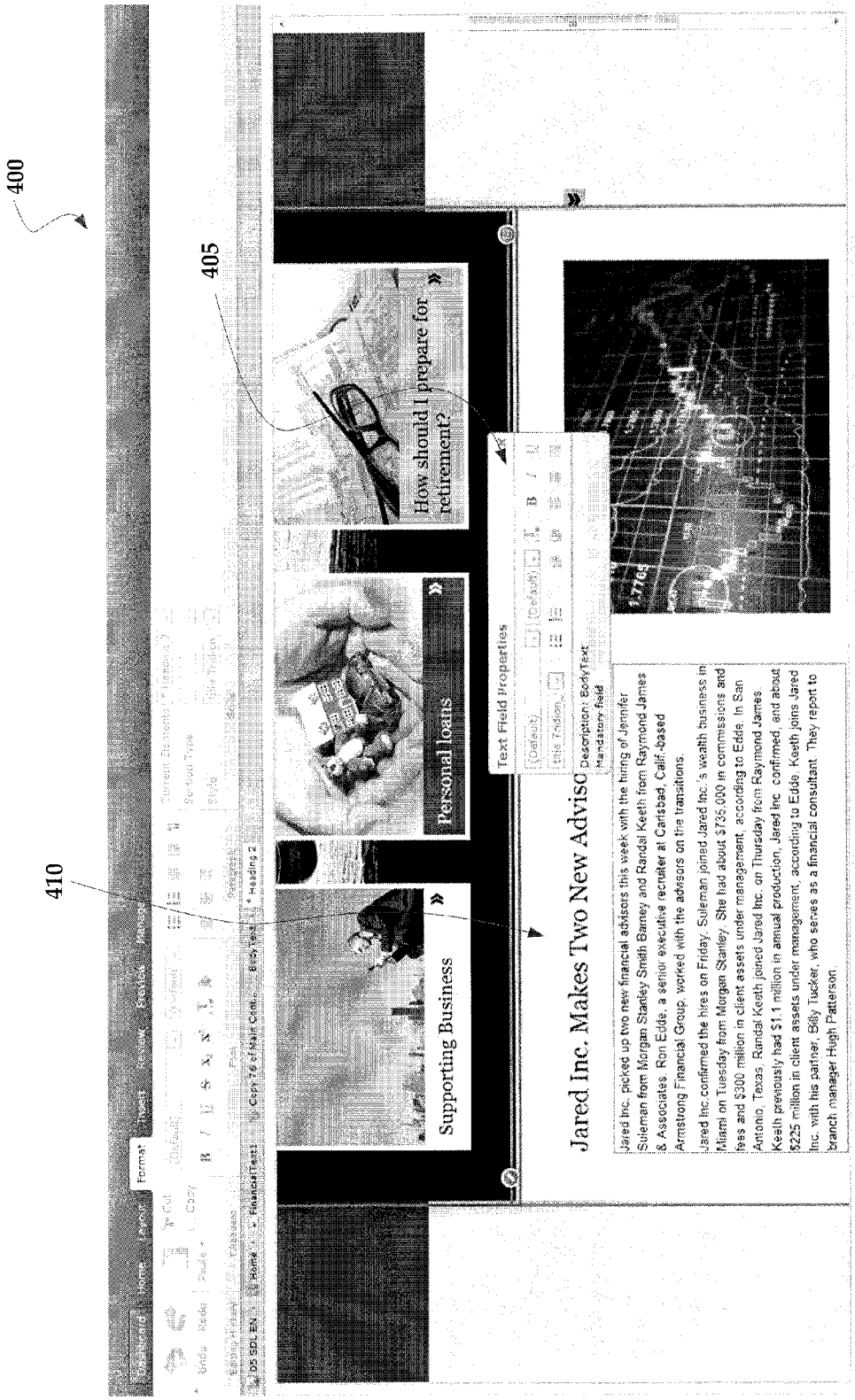
FIG. 4 illustrates modification of an exemplary editable preview of a webpage.

FIG. 4 illustrates the modification of an exemplary editable preview 400 of a webpage. The editable preview 400 is shown being edited by a content editor using a text field property menu 405. The text field property menu 405 may allow the content editor to modify properties of text field 410, such as font, size, and so forth.

Figure 5:
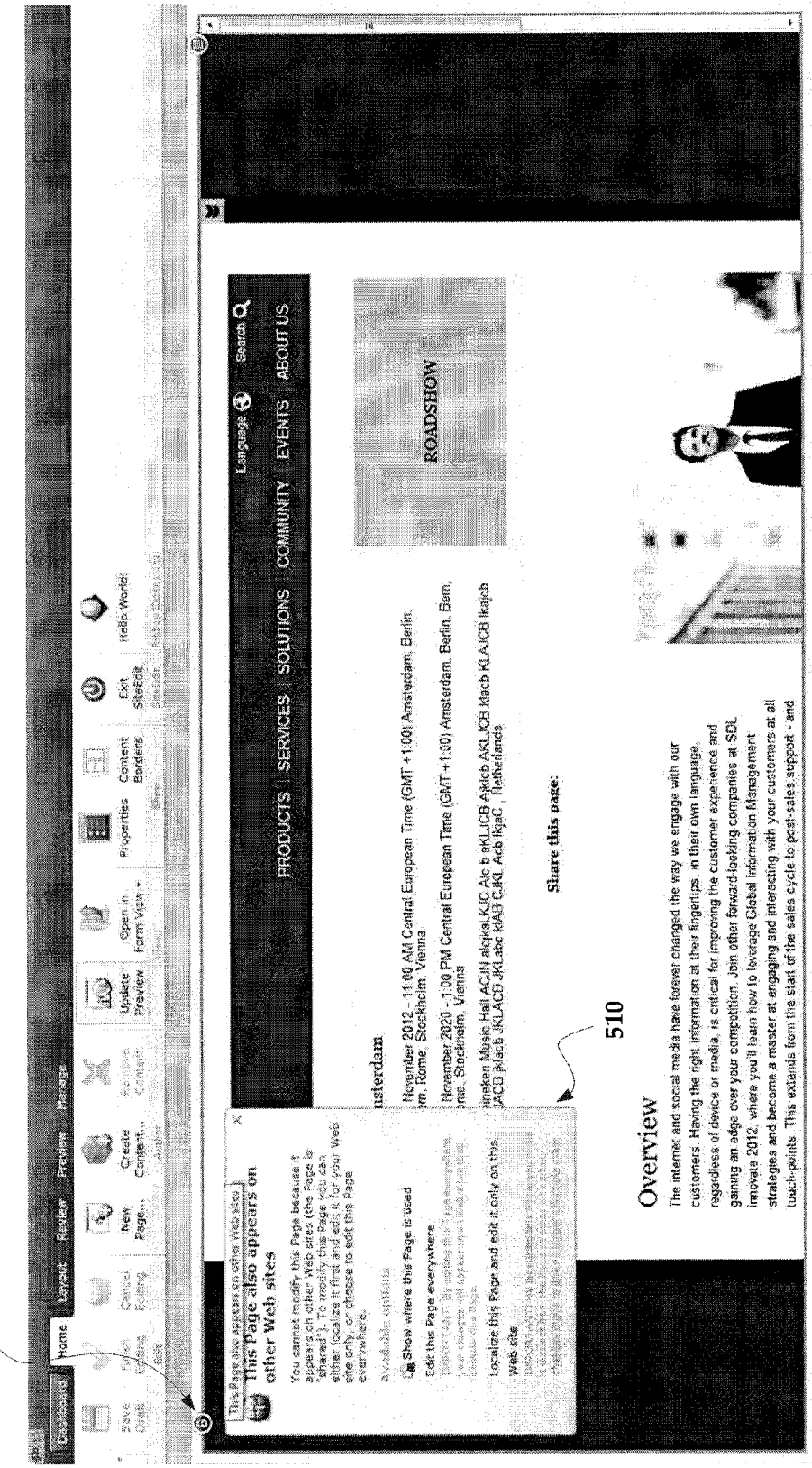
FIG. 5 illustrates an exemplary editable preview that includes a locked notification.

FIG. 5 illustrates an exemplary editable preview 500 in a locked configuration and displaying a locked notification 505. In some instances, the locked notification 505 comprises an icon that resembles a red, locked padlock. The locked notification 505 may inform a subsequent content editor that a particular asset currently unavailable for editing. The asset may be unavailable for edit for any one of a number of reasons. For example, the locked notification may inform the content editor that another editor is already editing the asset, or that a system administrator did not grant the permissions to perform an edit for that asset or class of assets. In other instances the locked notification may be provided when the content is being used on other websites and editing requires localization action to be completed.

In this instance, the preview includes a locked notification that comprises a message 510 that notifies the content editor that the webpage that is represented by the editable preview 500 appears on other websites. Therefore, modifications to this editable preview 500 may be migrated to and affect other web sites that host different versions of the webpage.

Figure 6:
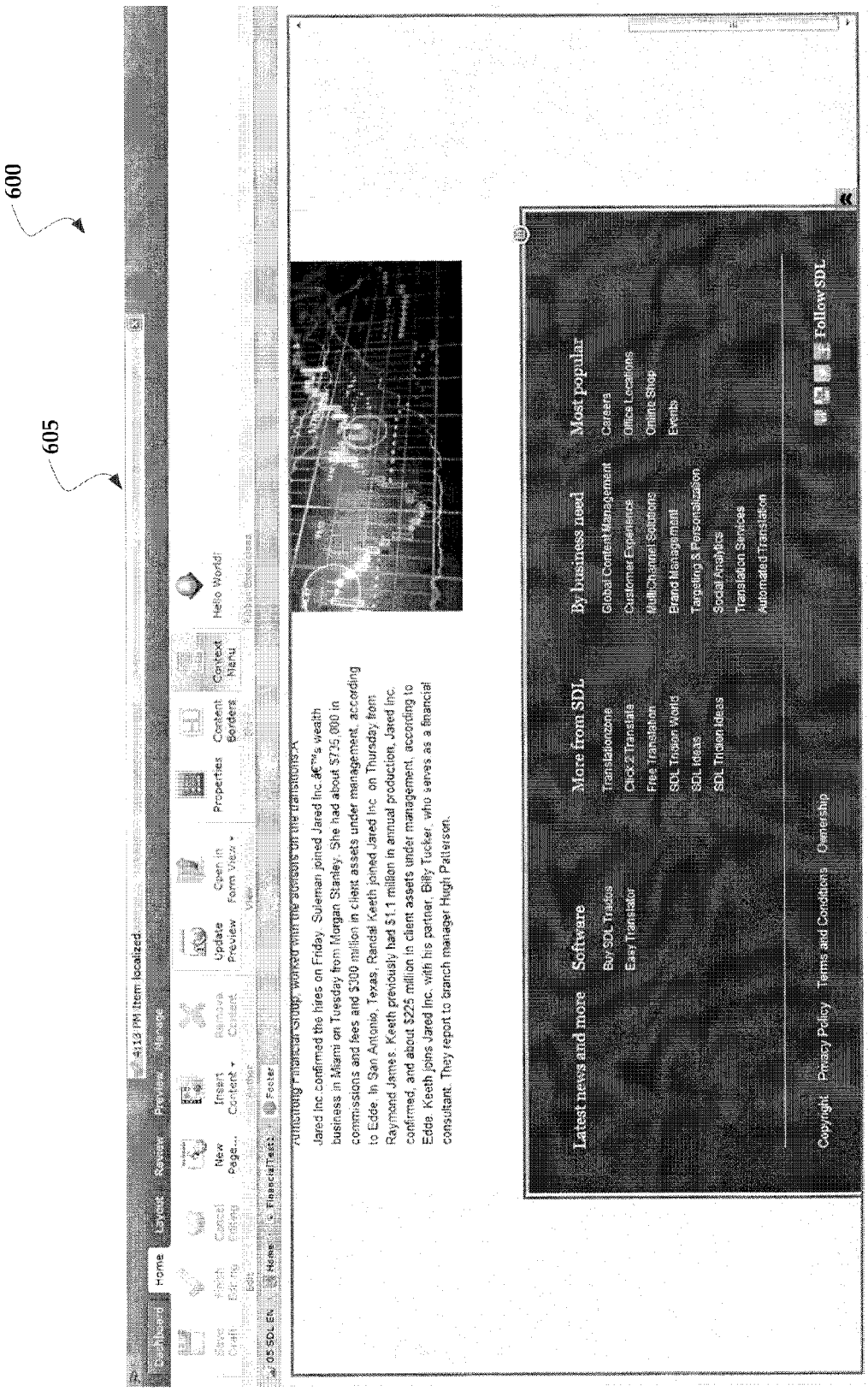
FIG. 6 illustrates the exemplary editable preview of FIG. 5 in an unlocked configuration.

FIG. 6 illustrates the exemplary editable preview 500 of FIG. 5 in an unlocked configuration. The editable preview 600 includes a notification 605 that the selected item has been localized (e.g., that the webpage was selected for editing by a content editor).

Figure 7:
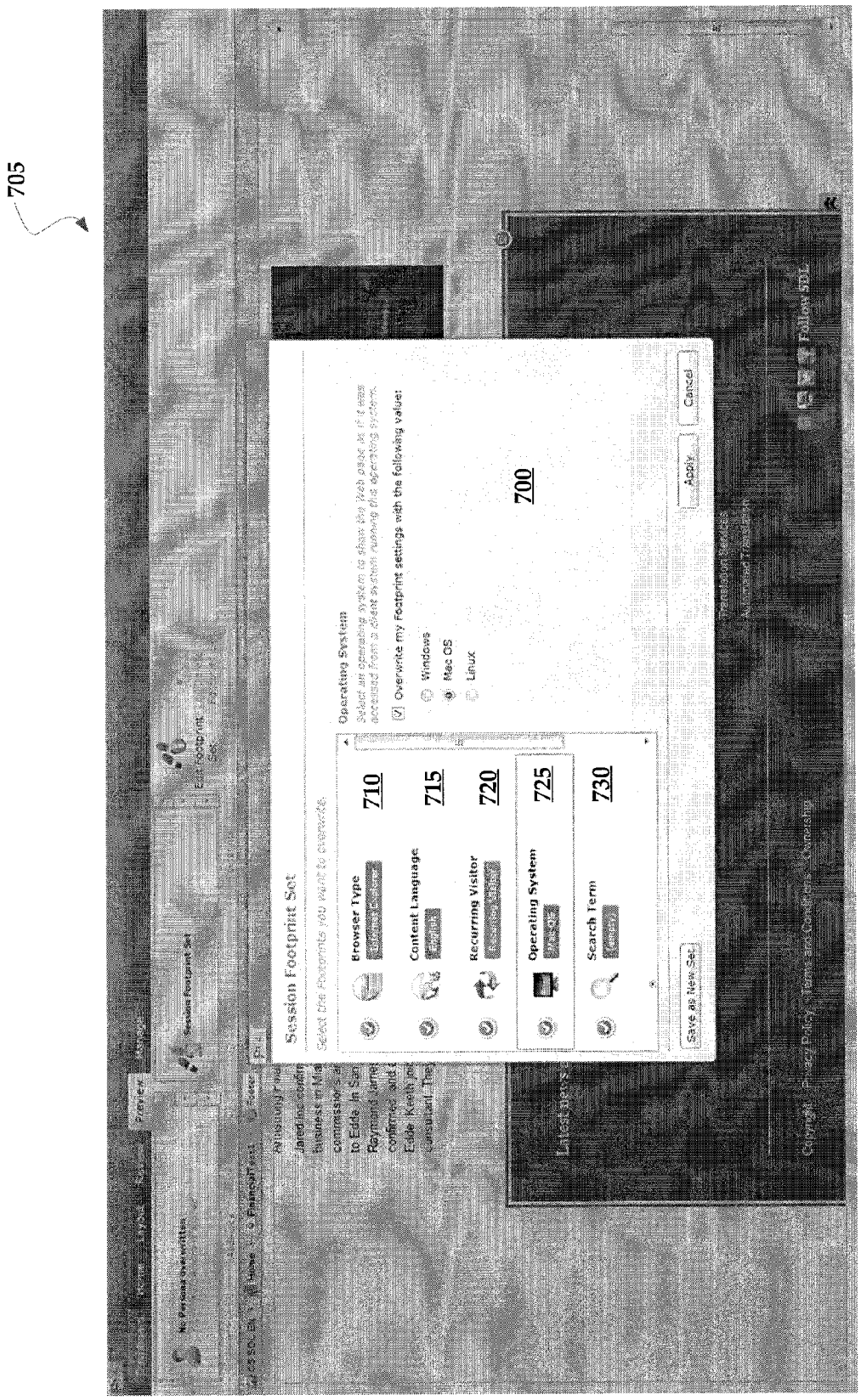
FIG. 7 illustrates an exemplary graphical user interface that comprises a plurality of emulation attributes.

FIG. 7 illustrates an exemplary emulation attribute GUI 700 that comprises a plurality of emulation attributes that define an emulation template that may be utilized to render a preview 705 of the webpage. The GUI 700 may include browser type selections 710, content language selections 715, recurring visitor selection 720, operating system selections 725, and search term selection 730—just to name a few.

Figure 8:
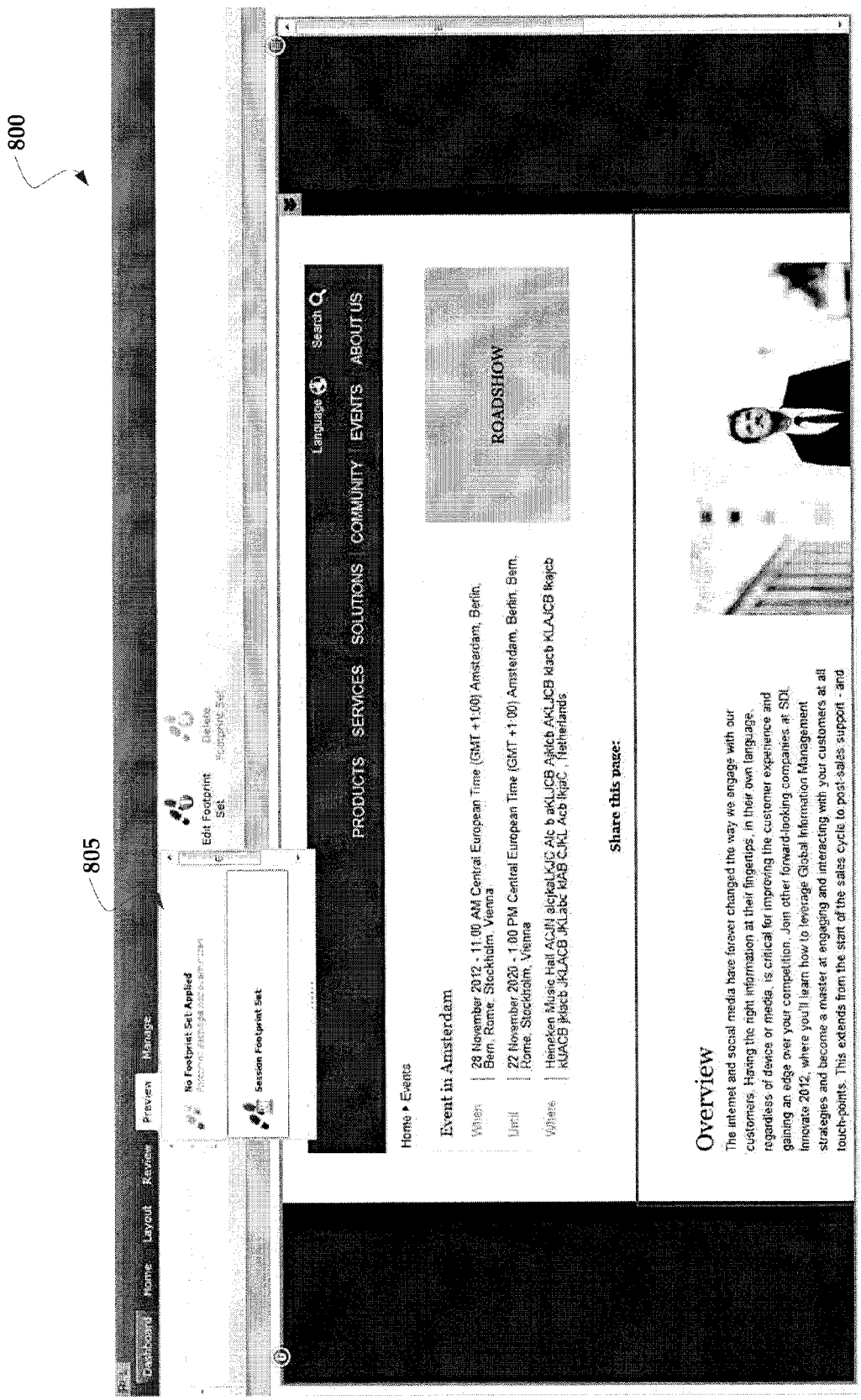
FIG. 8 illustrates an exemplary editable preview of a webpage that was generated using an emulation template.

FIG. 8 illustrates an exemplary editable preview 800 of a webpage that was generated using an emulation template. The GUI associated with the editable preview 800 may include a dropdown menu 805 that allows the content editor to view the emulation template that was utilized to generate the editable preview 800 and open an emulation attribute GUI, such as GUI 700 of FIG. 7.

Figure 9:
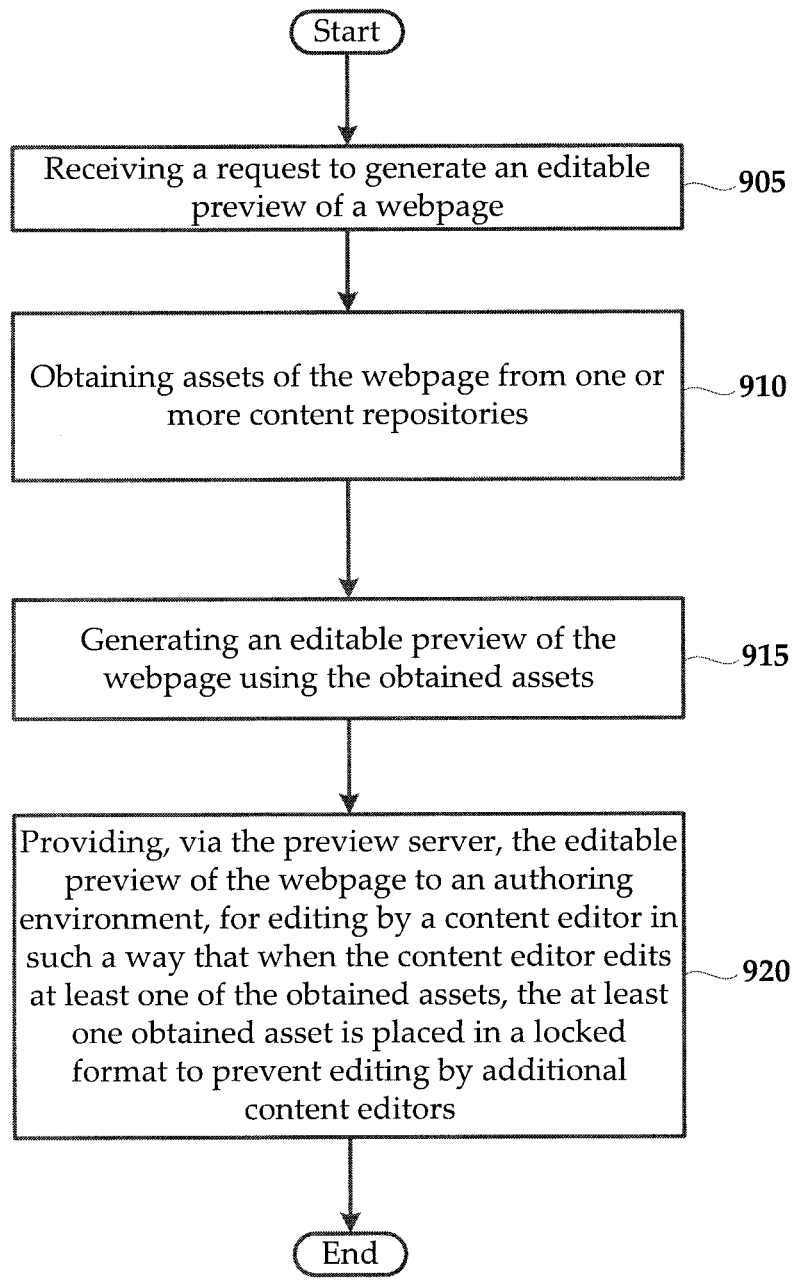
FIG. 9 illustrates a flowchart of an exemplary method for managing an editable preview of a webpage.

FIG. 9 illustrates a flowchart of an exemplary method for managing an editable preview of a webpage. According to some embodiments, the method may include a step 905 of receiving a request to generate an editable preview of a webpage. In some instances, the webpage may comprise assets arranged according to a layout. Additionally, the preview may be generated via a preview server 120 and pre-published to an authoring environment 155 that is separate from the preview server 120 that publishes the webpage.

Next, the method may comprise the step 910 of obtaining assets of the webpage from one or more content repositories or databases. As mentioned previously, the assets may be associated with the webpage via identifiers. Moreover, assets may be selected from both the content associated with a published version of the webpage, along with delta content that includes changed content relative to the published version of the webpage. For example, the preview may include previous modifications from other content editors.

The method may also comprise a step 915 of generating an editable preview of the webpage using the obtained assets, along with a step 920 of providing the editable preview of the webpage to an authoring environment, for editing by a content editor in such a way that when the content editor edits at least one of the obtained assets, the at least one obtained asset is placed in a locked format to prevent editing by additional content editors.

Figure 10:
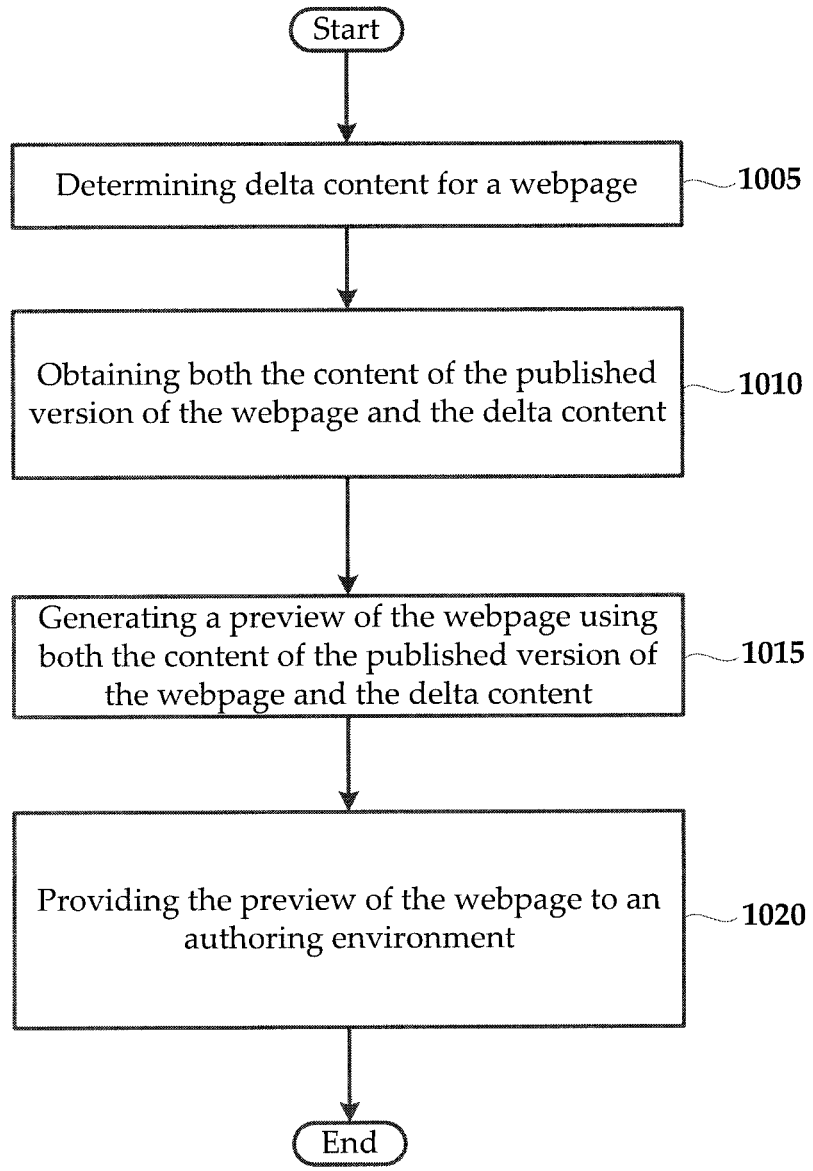
FIG. 10 illustrates a flowchart of an exemplary method for generating an editable preview of a webpage.

FIG. 10 illustrates a flowchart of an exemplary method for generating an editable preview of a webpage. The method may comprise a step 1005 of determining delta content for a webpage. Again, delta content may comprise changes in content between a published version of the webpage and at least one non-published version of the webpage. Once the delta content has been determined, the method may comprise a step 1010 of obtaining both the content of the published version of the webpage and the delta content.

The method may comprise a step 1015 of generating a preview of the webpage using both the content of the published version of the webpage and the delta content, along with a step 1020 of providing the preview of the webpage to an authoring environment generated by a preview server.

It is noteworthy that the methods described herein may comprise fewer or more steps relative to those cited herein.

Figure 11:
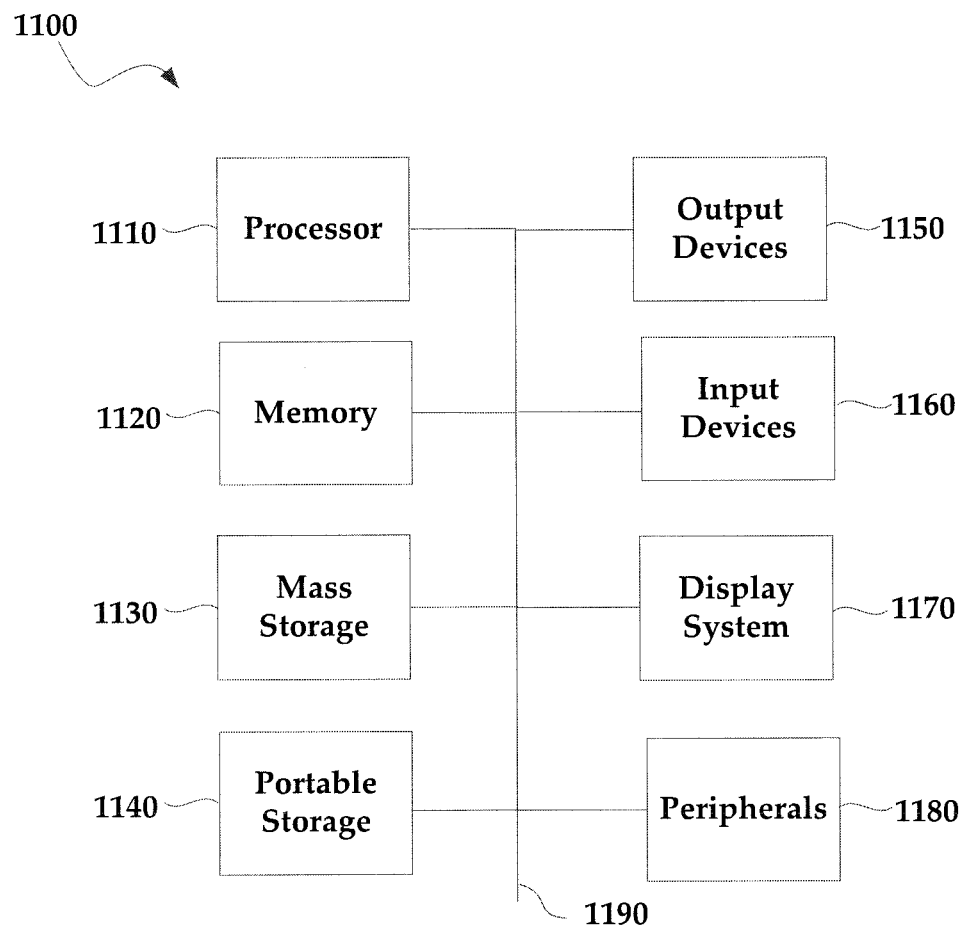
FIG. 11 illustrates an exemplary computing system that may be used to implement embodiments according to the present technology.

FIG. 11 illustrates an exemplary computing device (also referred to as system) 1100 that may be used to implement an embodiment of the present technology. The system 1100 of FIG. 11 (or portions thereof) may be implemented in the context of architecture 100 (FIG. 1). The computing device 1100 of FIG. 11 includes one or more processors 1110 and main memory 1120. Main memory 1120 stores, in part, instructions and data for execution by processor 1110. Main memory 1120 may store the executable code when in operation. The system 1100 of FIG. 11 further includes a mass storage device 1130, portable storage medium drive(s) 1140, output devices 1150, user input devices 1160, a display system 1170, and peripheral devices 1180.

The components shown in FIG. 11 are depicted as being connected via a single bus 1190. The components may be connected through one or more data transport means. Processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 may store the system software for implementing embodiments of the present invention for purposes of loading that software into main memory 1120.

Portable storage device 1140 operates in conjunction with a portable non-volatile storage medium, such as a floppy disk, compact disk, digital video disc, or USB storage device, to input and output data and code to and from the computing device 1100 of FIG. 11. The system software for implementing embodiments of the present invention may be stored on such a portable medium and input to the computing device 1100 via the portable storage device 1140.

Input devices 1160 provide a portion of a user interface. Input devices 1160 may include an alphanumeric keypad, such as a keyboard, for inputting alpha-numeric and other information, or a pointing device, such as a mouse, a trackball, stylus, or cursor direction keys. Additionally, the system 1100 as shown in FIG. 11 includes output devices 1150. Suitable output devices include speakers, printers, network interfaces, and monitors.

Display system 1170 may include a liquid crystal display (LCD) or other suitable display device. Display system 1170 receives textual and graphical information, and processes the information for output to the display device.

Peripherals 1180 may include any type of computer support device to add additional functionality to the computer system. Peripheral device(s) 1180 may include a modem or a router.

The components provided in the computing device 1100 of FIG. 11 are those typically found in computer systems that may be suitable for use with embodiments of the present invention and are intended to represent a broad category of such computer components that are well known in the art. Thus, the computing device 1100 of FIG. 11 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, and/or any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for managing an editable preview of a webpage, the method comprising:

receiving a request to generate a plurality of editable previews of a webpage, each editable preview comprising a rendering of the webpage that allows a content editor to edit content of the webpage in context view and to view edits to the webpage in a visual format that conforms to how the webpage will actually be rendered by a particular browsing application, the editable preview generated via a preview server, the preview server being used to generate each of the various editable previews of the same webpage, the webpage comprising assets arranged according to a layout;

responsive to the request, obtaining, via the preview server, assets of the webpage from at least one content repository;

generating, via the preview server, a first editable preview of the plurality of editable previews of the webpage using the obtained assets, the layout, and selections of a plurality of emulation attributes from an emulation template that determine how to generate a view of the webpage as it would be rendered by a particular browser application on a particular computing device having a selected operating system, the plurality of emulation attributes comprising any of visitor preferences and ambient data;

providing, via the preview server, the first editable preview of the webpage to an authoring environment for editing by a first content editor, the first editable preview emulating the webpage as it would be rendered for the particular browser application, the particular computing device, and the selected operating system;

receiving a selection of at least one obtained asset for editing by the first content editor, the selection of the at least one obtained asset within the first editable preview causing the preview server to lock the at least one obtained asset to prevent editing by additional content editors;

providing a second editable preview of the plurality of editable previews of the webpage to a second content editor, the second editable preview emulating the webpage as it would be rendered for another particular browser application, another particular computing device, and another selected operating system, the at least one obtained asset of the second editable preview of the webpage being in the locked format;

providing a locked notification to the second content editor when the second content editor attempts to modify the at least one obtained asset in the locked format; and updating the at least one obtained asset in the second editable preview of the webpage provided to the second content editor in real-time as the first content editor edits the at least one obtained asset.

2. The method according to claim 1, further comprising:
receiving modifications to at least one of the obtained assets of the editable preview;
updating the at least one of the obtained assets of the editable preview to include the modifications; and
providing an updated editable preview of the webpage to the authoring environment.

3. The method according to claim 2, further comprising updating at least a portion of the webpage based upon the modifications to the at least one obtained asset of the editable preview.

4. The method according to claim 3, further comprising updating identifiers for the webpage when the first or the second content editor modifies the at least one obtained asset, the identifiers associating assets with the webpage.

5. The method according to claim 1, further comprising unlocking the at least one obtained asset in the locked format when the first content editor is finished editing the at least one obtained asset in the locked format.

6. The method according to claim 5, further comprising providing an unlocked notification to the second content editor when the first content editor is finished modifying the at least one obtained asset.

7. The method according to claim 6, further comprising generating a second editable preview of the webpage for the second content editor, the second editable preview comprising highlights that indicate modifications to at least one obtained asset generated by any of the additional content editors other than the first and second content editors.

8. The method according to claim 1, wherein generation of the editable preview is affected by access rights of the first or the second content editor.

9. The method according to claim 1, wherein the editable preview of the webpage includes at least one difference relative to a currently published version of the webpage.

10. An authoring environment for managing an editable preview of a webpage, the authoring environment comprising:
a memory for storing executable instructions; and
a processor for executing the instructions to:
receive a first request to generate a first editable preview of the webpage, the first editable preview being a rendering of the webpage that allows a first content editor to edit content in context and to view edits to the webpage in a visual format that conforms to how the webpage will actually be rendered by a first particular browsing application;
receive a second request to generate a second editable preview of the webpage, the second editable preview being a rendering of the webpage that allows a second content editor to edit content in context and to view edits to the webpage in a visual format that conforms to how the webpage will actually be rendered by a second particular browsing application;
obtain assets of the webpage from at least one content repository;
generate the first and second editable previews of the webpage using the obtained assets, each of the first and second editable previews rendered differently depending upon the operating system and browser application that is utilized to render the webpage, the webpage comprising assets arranged according to a layout, wherein the combination of the operating system and browser is different for the respective first and second editable previews;
apply a first and second emulation template to the webpage to generate a first and second view, respectively, of the webpage as it would be rendered by a respective particular computing system that utilizes a respective particular browser application on a respective operating system;
provide a first generated editable preview of the webpage for the first particular computing system and the first particular browser application to a first content editor for editing;
determine a portion of the obtained assets of the first editable preview where editing of the portion of the assets requires a localization action to be completed;
lock the determined portion of the assets of the first editable preview of the webpage; and
receive a selection of a non-locked asset for editing by the first content editor, the authoring environment being separate from a preview server that publishes the webpage.

11. The authoring environment according to claim 10, wherein the authoring environment is communicatively coupled with a content manager that:
receives modifications to at least one of the obtained assets of the first editable preview;
updates the at least one of the obtained assets of the first editable preview to include the modifications; and
provides the updated first editable preview of the webpage to the authoring environment.

12. The authoring environment according to claim 11, wherein the authoring environment further:
provides the second editable preview to the second content editor, the second editable preview including the at least one of the obtained assets in the locked format; and
provides a locked notification to the second content editor when the second content editor attempts to modify the at least one of the obtained assets in the locked format.

13. The authoring environment according to claim 12, wherein the authoring environment further generates a second editable preview of the webpage for the second content editor, the second editable preview comprising highlights that indicate modifications to at least one obtained asset, the modifications generated by another content editor.

14. The authoring environment according to claim 11, wherein the authoring environment further unlocks the at least one of the obtained assets in the locked format when the first content editor is finished modifying the at least one of the obtained assets in the locked format.

15. The authoring environment according to claim 14, wherein the authoring environment further provides an unlocked notification to the second content editor when the first content editor is finished modifying the at least one obtained asset.

16. The authoring environment according to claim 11, wherein the content manager updates the assets of the webpage based upon the modifications to the at least one of the obtained assets of the editable preview.

17. The authoring environment according to claim 11, wherein the content manager further updates one or more identifiers for the webpage when the content editor modifies the at least one obtained asset, the one or more identifiers associating assets with the webpage.

18. The authoring environment according to claim 10, wherein the authoring environment is communicatively coupled with a preview server that generates the first editable preview of the webpage by applying an emulation template to the webpage.

19. The authoring environment according to claim 10, wherein the authoring environment is communicatively coupled with a content manager that determines how the first content editor can modify the assets of the editable preview based upon access rights of the first content editor.

* * * * *